US008733233B2

(12) United States Patent
Samso Besora

(10) Patent No.: US 8,733,233 B2
(45) Date of Patent: May 27, 2014

(54) MACHINE FOR PREPARING COFFEE

(75) Inventor: Xavier Samso Besora, Berga (ES)

(73) Assignee: Minima Espresso Systems, S.L. (ES)

( * ) Notice: Subject to any disclaimer, the term of this patent is extended or adjusted under 35 U.S.C. 154(b) by 179 days.

(21) Appl. No.: 13/262,160

(22) PCT Filed: Mar. 30, 2010

(86) PCT No.: PCT/IB2010/051384
§ 371 (c)(1),
(2), (4) Date: Sep. 29, 2011

(87) PCT Pub. No.: WO2010/113116
PCT Pub. Date: Oct. 7, 2010

(65) Prior Publication Data
US 2012/0017767 A1 Jan. 26, 2012

(30) Foreign Application Priority Data

Apr. 3, 2009 (ES) .................................. 200930034

(51) Int. Cl.
*A47J 31/40* (2006.01)
*A47J 31/36* (2006.01)
*A47J 31/34* (2006.01)
(52) U.S. Cl.
CPC . *A47J 31/36* (2013.01); *A47J 31/34* (2013.01)
USPC ...................... 99/302 P; 99/302 R
(58) Field of Classification Search
USPC ...................... 99/297, 302 P, 302 R
See application file for complete search history.

(56) References Cited

U.S. PATENT DOCUMENTS

| 2,529,395 | A | * | 11/1950 | Hummel | 99/302 P |
|---|---|---|---|---|---|
| 3,356,011 | A | * | 12/1967 | Parraga | 99/289 R |
| 5,280,747 | A | * | 1/1994 | Bonneville et al. | 99/287 |
| 5,896,805 | A | * | 4/1999 | Katou et al. | 99/289 R |
| 7,377,207 | B2 | * | 5/2008 | Hug et al. | 99/287 |
| 2007/0227363 | A1 | | 10/2007 | Verna | |
| 2008/0295698 | A1 | * | 12/2008 | Carr et al. | 99/302 R |

FOREIGN PATENT DOCUMENTS

| EP | 0 231 156 A1 | 8/1987 |
|---|---|---|
| GB | 728 476 A1 | 4/1955 |
| GB | 765 801 A1 | 1/1957 |
| WO | 2007/088309 A1 | 8/2007 |

OTHER PUBLICATIONS

International Search Report from PCT/IB2010/051384 dated Jun. 9, 2010, 2 pages.

* cited by examiner

*Primary Examiner* — Reginald L Alexander
(74) *Attorney, Agent, or Firm* — Barnes & Thornburg LLP

(57) ABSTRACT

A Machine for preparing coffee comprising a infusion chamber to house at least a coffee dose, and means for feeding pressurized water to said infusion chamber, said means comprising a cylinder and plunger assembly, said plunger defining inside the cylinder a chamber to house a preset quantity of water, and said plunger being able to accumulate, in an active position, potential energy capable of being transmitted as a pressure to the water of said chamber, when said plunger contacts, in said active position, with the water of said chamber. It is characterized in that said infusion chamber is placed adjacent below the water chamber of said cylinder, both chambers including at least one hole through which, once opened, passes the pressurized water to said infusion chamber, said plunger moving back to the rest position inside said chamber as pressurized water is fed through said hole.

16 Claims, 6 Drawing Sheets

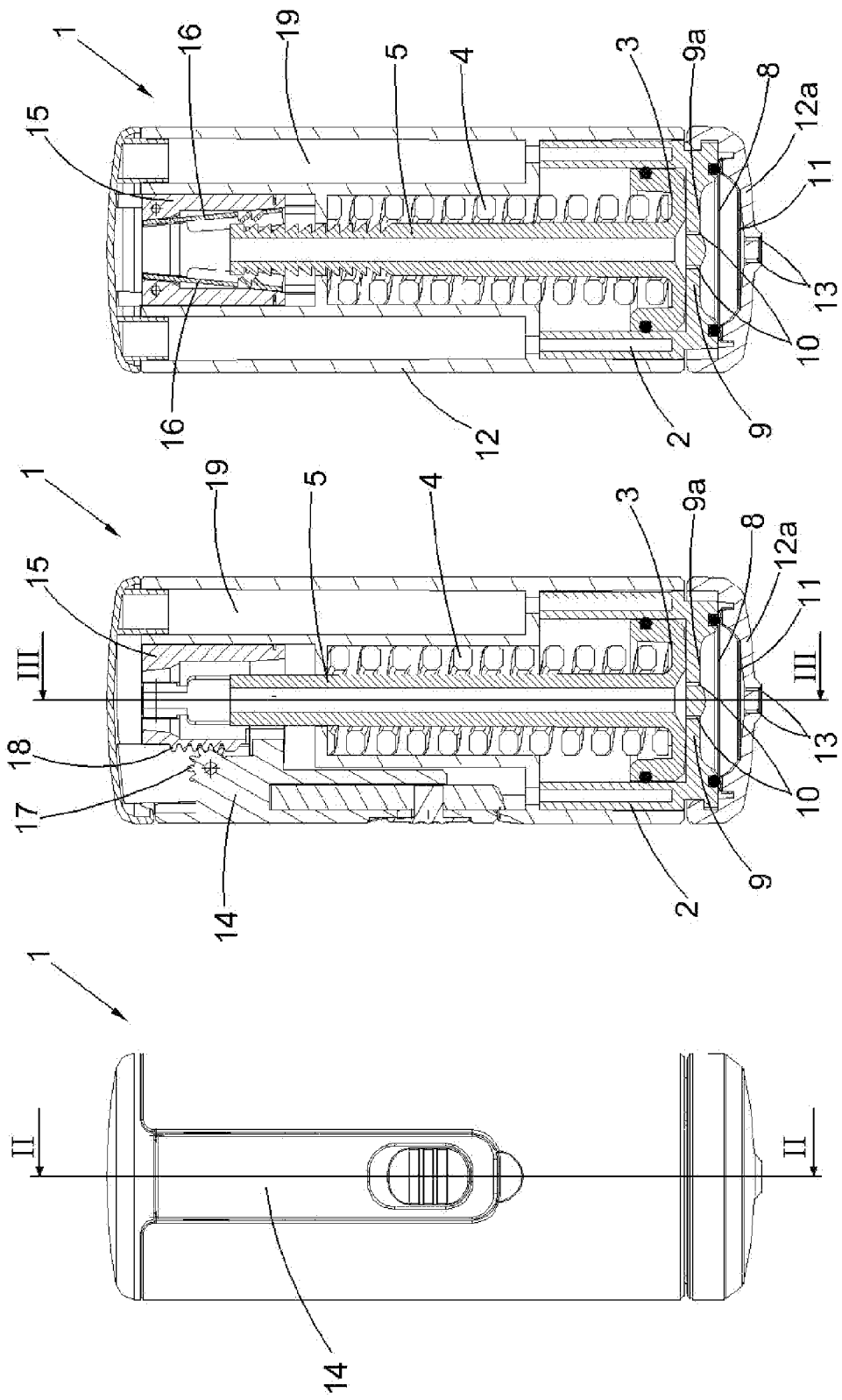

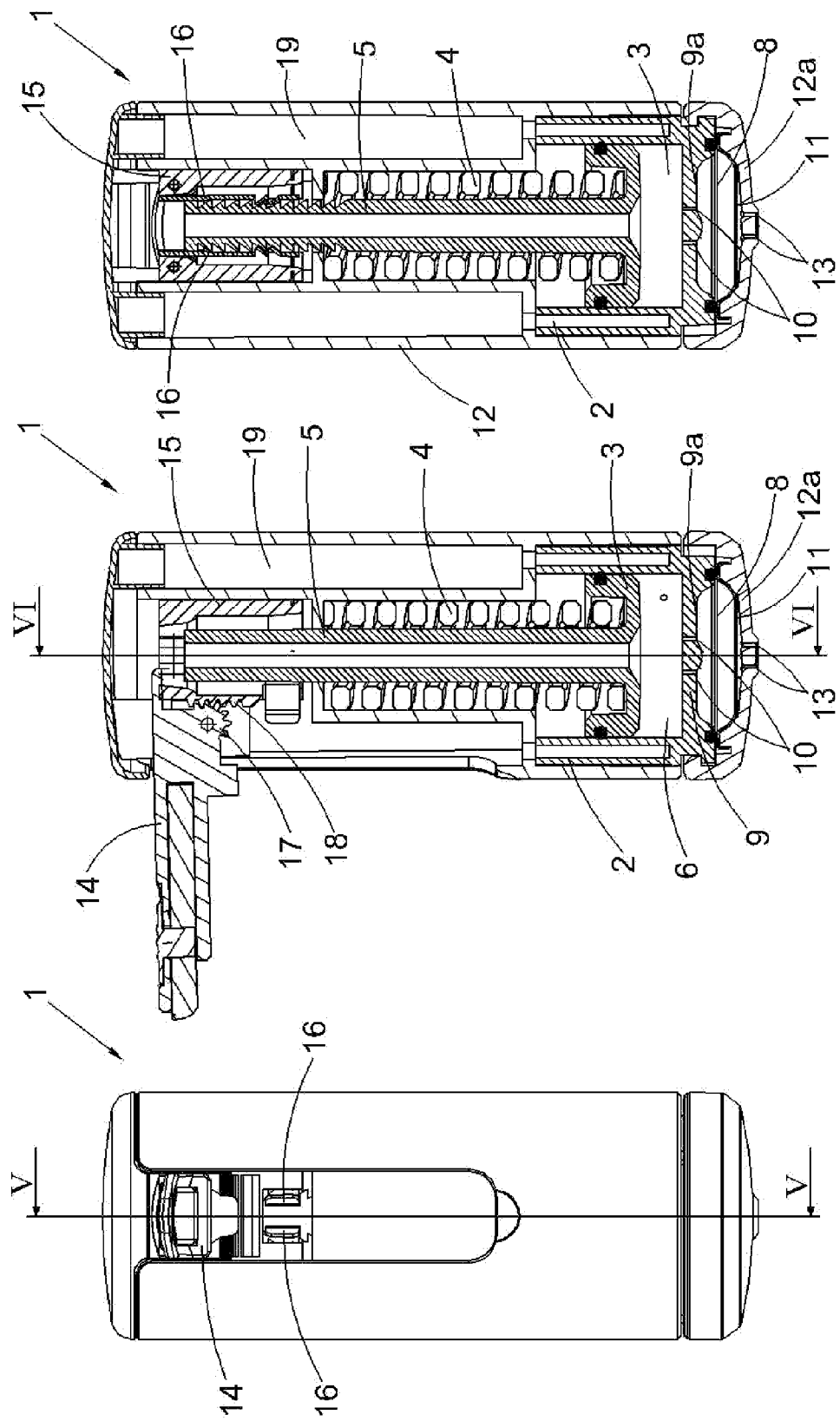

MACHINE FOR PREPARING COFFEE

CROSS-REFERENCE TO RELATED APPLICATIONS

This application is a U.S. national counterpart application of PCT International Application Serial No. PCT/IB2010/051384, filed Mar. 30, 2010, which claims priority to Spanish Patent Application Serial Number P200930034 filed Apr. 3, 2009. The disclosures of both of which are hereby incorporated herein by reference.

The present invention refers to a machine for preparing express coffee that can be operated without consumption of electric energy.

BACKGROUND OF THE INVENTION

It is known that to prepare express coffee it is necessary to pass hot water at a temperature above 80° C. through ground coffee, at a pressure above atmospheric pressure, preferably comprised between 7 and 9 atmospheres. Therefore, all the soluble components that provide the taste and flavor are extracted from the coffee.

The most characteristic component that differentiates the machines of express coffee from other machines for preparing coffee is the pressure pump, which permits to eject the water at the previously cited pressure, through the infusion chamber that comprises the dose of ground coffee.

Machines that present the particularity that the water pressure to obtain the express coffee is provided by alternative systems to the pressure pump have been developed for obtaining autonomous machines, in which the coffee can be prepared without consumption of electric energy.

International patent WO/2007/088309 discloses one of said machines, in which compressed gas is used instead of a pressure pump. Said compressed gas is injected on the hot water to force the passage of a preset quantity of said water through the infusion chamber. In this machine, that is marketed under the name of "Handpresso", the gas chamber is pressurized until it acquires the desired pressure by manual pumping of air contained in a cylinder. Then, the compressed gas is released to the receptacle that contains the water dose, to force the water passage through the infusion chamber.

In the machine disclosed in "Handpresso" patent, the pressure that the gas exerts on the water decreases during the distribution, as the water leaves space to the gas. Therefore, the pressure exerted by the gas on the water is not constant throughout the coffee distribution, resulting in a sub-extracted express or low density coffee, therefore of lower quality.

European patent EP0231156 discloses another machine for preparing coffee in which the pressure necessary to feed the water is obtained, in this case, from a plunger that accumulates elastic potential energy from the compression force of a spring placed at one end of the cylinder chamber defining said plunger.

The spring compression is carried out manually pumping water inside the chamber of the cylinder itself, with the objective of retracting the plunger to the active position. The reaction force of the spring on the plunger makes possible to keep a pressure on the water when the plunger moves inside the water chamber of the cylinder, to the rest position.

However, the configuration of the machine disclosed by said European patent has a lot of drawbacks.

One of said drawbacks is the fact that the water is fed through a tube network that connects the water chamber of the cylinder with the infusion chamber. In practice, the long path that the water must cover to reach the infusion chamber prevents the provision of a more or less constant pressure by said spring, which should have physical features to provide said pressure that would prevent it to be housed inside a device with reduced dimensions. Therefore, even in the case that it works, it would produce an express coffee of lower quality.

Another drawback is the fact that the cylinder-plunger assembly that feeds pressurized water is placed inside a deposit that stores the same water than afterwards is fed to the infusion chamber. This is not suitable from a sanitary point of view, and it affects negatively the maintenance of the coffee maker.

On the other hand, as a great number of elements are in contact with the water, even if boiling water is provided to said deposit, said configuration would prevent a suitable temperature of the water to be kept to obtain a coffee infusion in express quality.

SUMMARY OF THE INVENTION

The object of the present invention is to solve said drawbacks, providing a machine for preparing express coffee that solves said drawbacks and that can be used without the consumption of electric energy.

According to this object, the present invention provides a machine for preparing coffee that comprises a infusion chamber to house at least a coffee dose, and means for feeding pressurized water to said infusion chamber, said means comprising a cylinder and plunger assembly, said plunger defining inside the cylinder a chamber to house a preset quantity of water, and the plunger of said cylinder being able to accumulate, in an active position, potential energy capable of being transmitted as a pressure to the water of said chamber, when the plunger contacts, in said active position, with the water. Said machine is characterized in that the infusion chamber is placed adjacent below the water chamber of said cylinder, both chambers including at least one hole through which, once opened, the pressurized water passes to said infusion chamber, said plunger moving back to the rest position inside said chamber as pressurized water is fed through said hole.

In the machine of the present invention the water is fed pressurized from the cylinder chamber that contains the floating plunger to the adjacent infusion chamber placed below. Thanks to this feature, it is viable to guarantee a suitable pressure and temperature throughout the distribution to obtain a high quality express coffee by a simple cylinder and plunger assembly, which can be operated manually, and which requires a reduced number of conducts and components for its operation.

Another advantage of the machine of the present invention is that, as the infusion chamber is placed adjacent to the cylinder chamber that stores the water, the size of the coffee maker can be reduced, and its design is very compact. This is especially interesting in a coffee maker as that of the present invention, which can be used not connected to the electric mains and, therefore, it is capable to be transported from one site to another, at the job, in outdoor activities, in vacation residences, etc.

Preferably, both chambers define a wall that includes said hole.

Also preferably, the wall that defines both chambers is provided with a recess configured to receive a powder coffee dose, a coffee mono-dose bag or a coffee capsule. Therefore, the design is even simpler and more compact, the path of the water to contact with the coffee being extremely reduced.

Advantageously, said infusion chamber comprises a detachable wall placed in correspondence with the wall that comprises the holes through which the water from the cylinder chamber passes.

Optionally, said detachable wall is a wall of a detachable element of the housing of said machine.

According to a first embodiment of the present invention, the plunger of the machine accumulates elastic potential energy in its active position from the compression force applied to a spring placed in the cylinder chamber that houses the rod of said plunger.

However, alternatively, according to another embodiment, said plunger can accumulate potential energy in its active position from the compression force applied to a fluid placed inside the cylinder chamber that houses the rod of said plunger. In this case, preferably, the machine comprises a tank for storing said fluid and said tank communicates with the cylinder chamber that houses the rod of said plunger. In this tank can be stored the suitable volume of fluid to obtain the desired intervals of maximum and minimum pressure to obtain a quality express coffee. Advantageously, this fluid tank contains inside it the cylinder and plunger assembly. Therefore, the machine is very compact.

Preferably, the compression force applied to the spring or to the fluid is obtained when the rod of the plunger is retracted in the cylinder chamber for housing the water until it reaches the active position.

Advantageously, said machine comprises traction means which act on said rod to retract said plunger to said active position.

According to one embodiment, said traction means comprises a lever coupled to clamps capable of being engaged and disengaged to the rod of said plunger, said clamps permitting, in their engaging position, said rod to be retracted when said lever is driven in a preset rotation direction.

Advantageously, said clamps are hinged to a driving plunger joined to said lever through a gear wheel and a rack.

According to another embodiment, said traction means comprises a gearing-down system with an epicycloidal gear that acts on the rod of said plunger. The epicycloidal gear system presents the advantage that it offers a greater reduction ratio than the lever system. This gear system facilitates also the adjustment of the plunger system to domestic and professional use machines, including a motor and other elements to make the process automatic.

The epicycloidal gear and the lever can be manually or electrically driven.

In the spring embodiment and in the fluid embodiment, alternatively, the compression force is applied, while said plunger keeps its position fixed, when the compressor element of said spring or fluid is moved.

Preferably, in the spring embodiment, said compressor element is placed engaged at the end of the rod opposed to said plunger and, advantageously, said compressor element comprises an internal thread engageable to the threaded end of said rod, so that said spring is compressed when said element is threaded in the end of said rod.

Also advantageously, said compressor element is integrally joined to an element of the housing of said machine.

Preferably, the machine comprises a duct that communicates the cylinder water chamber with a tank for storing water, said duct permitting to suck the water of said tank when said plunger is retracted inside said chamber.

This way, the water necessary to make a coffee can be fed to the cylinder chamber at the same time that the rod of the cylinder is retracted to reach its active position.

Advantageously, said machine comprises means for heating the water placed at a wall of the cylinder chamber. Even though, alternatively, said means for heating water can be placed at the cylinder plunger itself, or at the water tank.

According with a last aspect, the present invention refers also to a device that includes a plurality of machines as those claimed.

The machines of said device can share e.g. a single tank to store hot water.

BRIEF DESCRIPTION OF THE DRAWINGS

For a better understanding of what has been disclosed some drawings are attached in which, diagrammatically and only as a non-limitative example, four embodiments are shown.

In said drawings,

FIGS. 1-9 correspond to first and second embodiments of the machine, in which the potential energy that the plunger accumulates is from the compression force applied to a spring.

FIG. 1 shows an external view of the first embodiment;

FIG. 2 shows a section view of FIG. 1, with the cylinder plunger in the rest position;

FIG. 3 shows a section view of FIG. 2;

FIG. 4 shows an external view of the same embodiment, with the lever elevated from the traction mechanism;

FIG. 5 shows a section view of FIG. 4, in which the cylinder plunger has been retracted to an intermediate position;

FIG. 6 shows a section view of FIG. 5;

FIG. 7 shows a analogous section to FIGS. 2 and 5, with the plunger of the cylinder in the active position;

FIG. 8 shows a section analogous to FIGS. 3 and 6, with the plunger of the cylinder in the active position;

FIG. 9 shows a diagrammatical view of a section of the machine corresponding to the second embodiment, in which the spring is compressed when the compressor element engaged to an end of the rod is moved;

FIGS. 10 and 11 show two diagrammatical views of a section of the machine corresponding to a third and fourth embodiments, in which the potential energy that the plunger accumulates comes from the compression force applied to a fluid.

DESCRIPTION OF PREFERRED EMBODIMENTS

Figure 7:
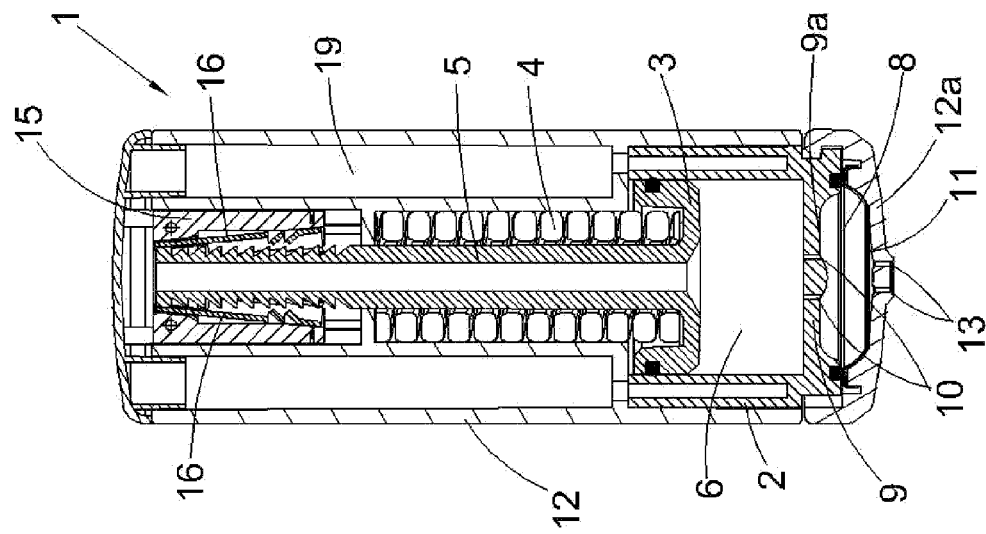

Hereinafter two embodiments are described, in which the machine 1 of the present invention is constituted by a cylinder 2 and plunger 3 assembly, including a helical spring 4 mounted in the chamber that houses the rod 5 of the plunger 3.

Thanks to the presence of said spring 4, in both embodiments the plunger 3 is able to accumulate, in its active position, elastic potential energy from the compression force applied to said spring 4. Said potential energy is capable to be transmitted as pressure to the water stored in the cylinder chamber 6, defined by the plunger 3 itself.

Figure 8:
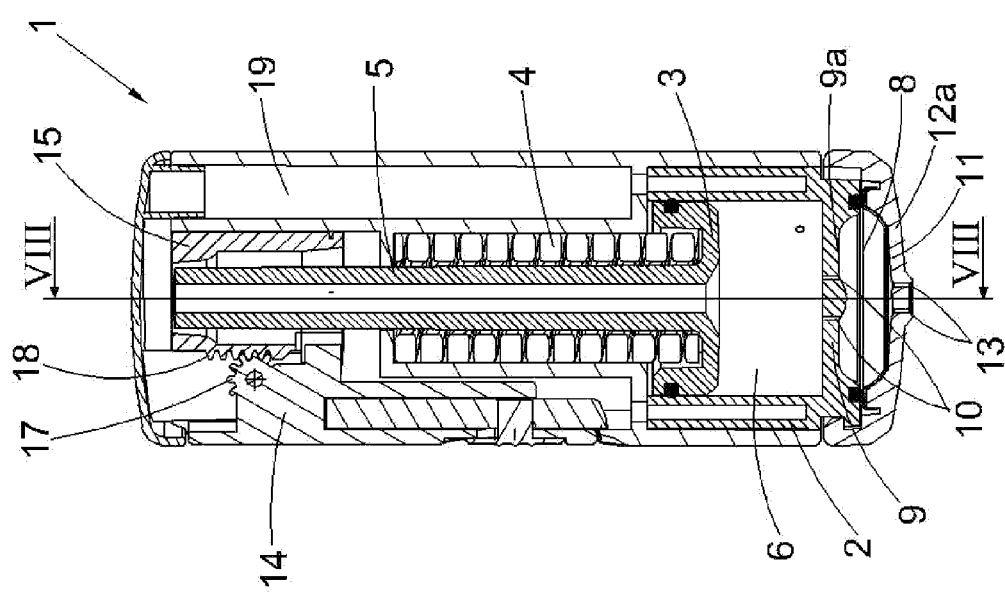

In the embodiment shown in FIGS. 1-8, the compression force on the spring 4 is applied when the rod 5 is retracted along the chamber 6, from the rest position shown in FIGS. 2 and 3, to the active position shown in FIGS. 7 and 8, in which the spring 4 is compressed. On the other hand, in the embodiment shown in FIG. 9, the compression force on the spring 4 is applied when a compressor element 7 is threaded in the end of the rod 5, while said plunger 3 is kept fixed.

However, in both embodiments, the chamber 6 in which the water is stored is placed adjacent to a second chamber 8 for housing the powder coffee dose. Said chamber 8, also called as infusion chamber, defines with the chamber 6 of the cylinder 2, a wall 9 including the holes 10 through which the pressurized water passes, in the open position of a passage valve, to prepare the coffee infusion.

As shown in the attached figures, the wall 9 is provided with a recess 9a configured to receive a standard mono-dose bag, E.S.E SYSTEM ("Easy Serving System") of powder coffee. However, said recess 9a can be configured to receive ground coffee or a coffee capsule. In this last case, the walls of the infusion chamber 8 would be provided with elements to perforate the capsule wall.

In the embodiment of FIGS. 1-8, the infusion chamber 8 includes a detachable wall 11 integrally joined to a detachable element 12a of the housing 12 that is engaged to the cylinder 2. Said element 12a includes an output hole 13 (with a diameter from 3 to 4 mm) to permit the distribution of the coffee infusion.

As stated previously, in this embodiment, the spring 4 is compressed when the rod 5 is retracted inside the chamber 6 of the cylinder 2. To this end, a traction mechanism is used, including a lever 14 joined to a plunger 15 to which clamps 16 are hinged, which are capable of being engaged and disengaged to the rod 5.

The lever 14 is joined to the plunger 15 by a gear wheel 17 and rack 18 mechanism, so that when the lever 14 is driven upwardly, the plunger 15 moves downwardly until said lever 14 is placed at a 90° angle with respect to the rod 5. In this moment, clamps 16 of the plunger 15 are engaged to the rod 5, making possible its retraction when the lever 14 is driven downwardly, and moving the plunger 15 upwardly.

In the embodiment shown in FIGS. 1-8, the vacuum generated when the plunger 3 is retracted in the chamber 6 of the cylinder 3, is used to suck water from a tank 19 provided at the cylinder 2 chamber itself comprising the spring 4. To this end, it is provided a duct with an anti-return valve, which communicates the tank 19 with the chamber 6 of the cylinder 2.

After the water suction is carried out, the lever 14 is driven again upwardly, but in this moment the clamps 16 are disengaged, releasing the rod 5 and its plunger 3. Due to the compression force of the spring 4, said plunger 3 tends to recover its position contacting with pressure the water stored in the chamber 6.

The lever 14 is driven successively until the all desired water volume is sucked, corresponding to a coffee dose, which is selected by the user among the three possibilities provided by the machine (short or "ristretto" from 20 to 25 ml, express from 30 to 35 ml, and long or "lungo" from 45 to 50 ml).

FIGS. 7 and 8 show two sections of the machine 1 in which, after driving successively the lever 14, the plunger 3 is in its active position contacting with a pressure the water volume stored in the chamber 6, due to the compression force of the spring 4.

Figure 9:
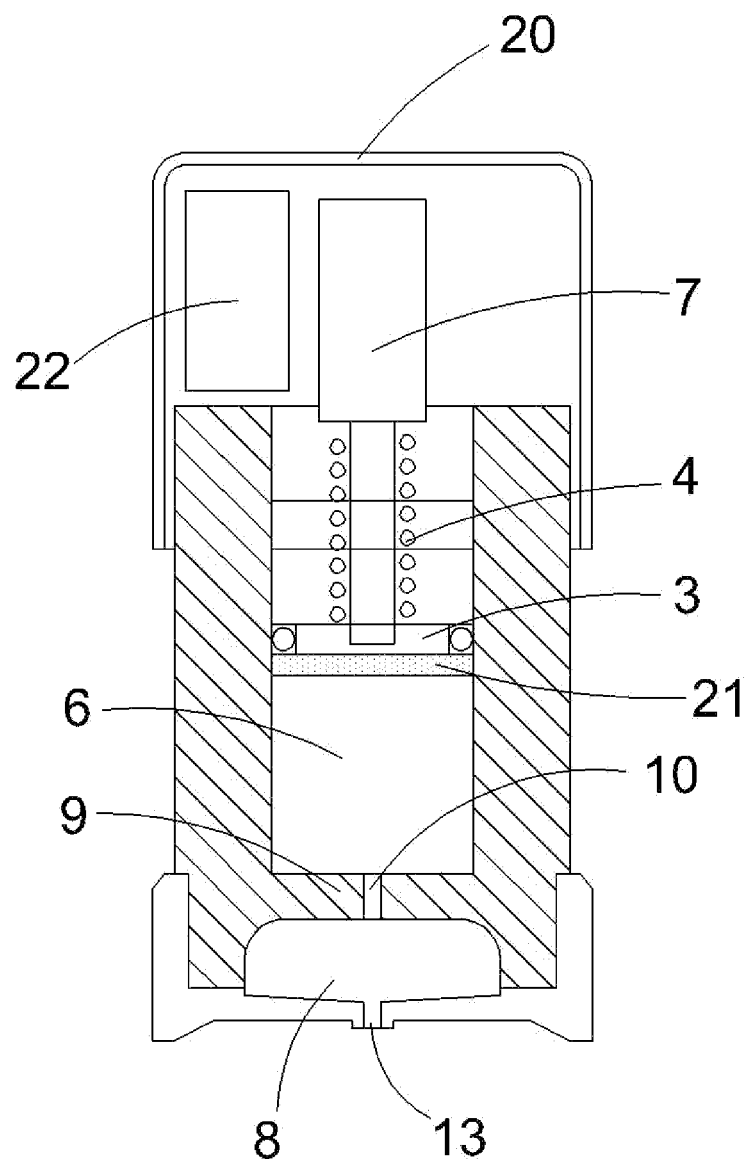

As stated previously, FIG. 9 describes a second embodiment of the machine 1 in which the compression force on the spring 4 is applied when a compressor element 7 is threaded in the end of the rod 5, when said plunger 3 is kept fixed. Said element 7 is integrally joined to a first body 20 of the housing.

In this embodiment, differently from the embodiment previously described, the chamber 6 of the cylinder 2 must be charged with water by the user before driving the compressor element 7.

To prepare the coffee, in both embodiments the passage valve of the holes 10 of the wall 9 of the chamber 6 of the cylinder 2 is opened, so that elastic potential energy accumulated by the plunger 3 is released, permitting the passage of a water flow with a pressure about 8 atmospheres through the holes 10, to a infusion chamber 8 placed below.

The water of the machine 1 can be heated by resistances 21, or an element equivalent by an exothermic reaction produced by the mix of two or more chemical components. This heating means will be placed preferably at the base of the infusion chamber 8, optionally, in the plunger 3 itself or, alternatively, in any wall of the chamber 6 that stores the water, or even in the duct of the deposit 19.

The resistances 21 can be fed by rechargeable batteries 22, which also can be used to feed a driving electric system of the lever 14 or the compressor element 7, alternative to the manual one, in other embodiments.

Even though two specific embodiments of the present invention have been described and shown, it is apparent that a person skilled in the art can introduce variations and modifications, or to substitute the details by other technically equivalent ones, without departing from the scope of protection defined by the attached claims.

E.g. even though reference is made in the present specification to two embodiments in which the plunger 3 accumulates potential energy, in its active position, from the compression force of a spring 4, said plunger 3 can accumulate potential energy from the compression force applied to a fluid. Hence, e.g. the elastic piston can be substituted by a compressed hydrogen piston or by a hydraulic piston, which can accumulate, also in its active position, potential energy capable of being transmitted as pressure to the water.

Figure 10:
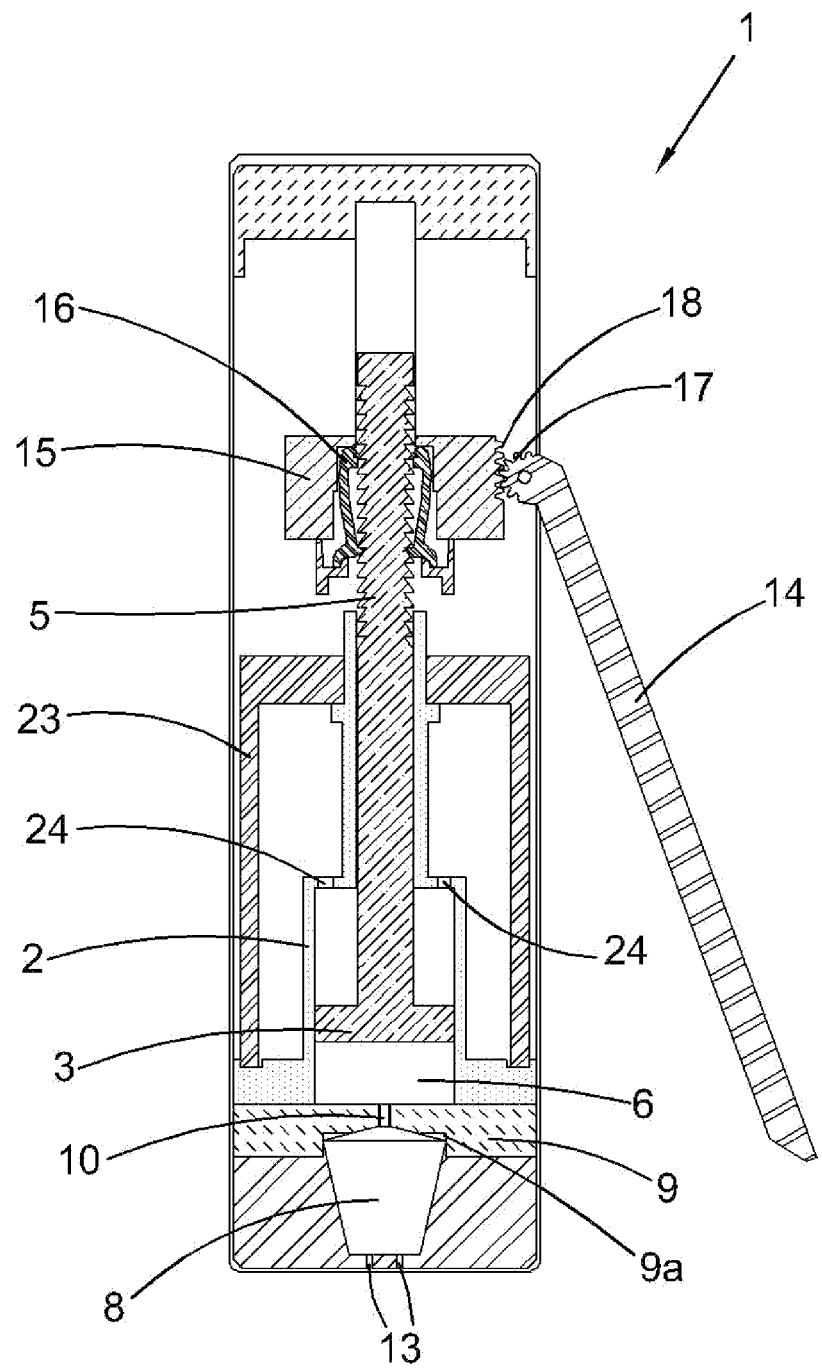
FIGS. 10 and 11 correspond to third and fourth embodiments in which the potential energy accumulated by the plunger is from the compression force applied to a fluid.
Figure 11:
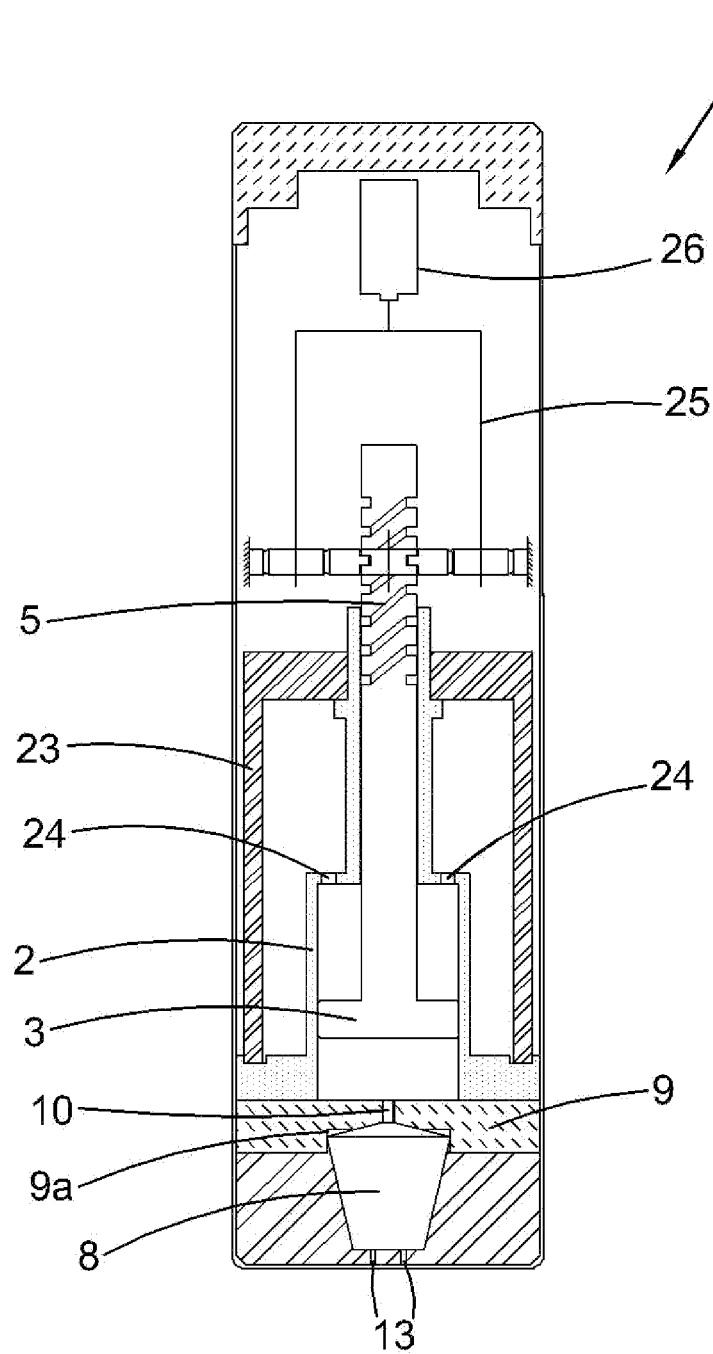

FIGS. 10 and 11 show a third and fourth embodiments of the machine 1 in which the potential energy that the plunger 3 accumulates comes from the compression force applied to a fluid placed in a tank 23 that communicates, through the holes 24, with the chamber of the cylinder 2 that houses the rod 5 of the plunger 3. The tank 23 works as a fluid compression spring which permits to obtain great pressures in a reduced space, when the rod 5 is retracted along the chamber 6 of the cylinder 2.

As shown in FIGS. 10 and 11, said tank 23 is placed inside the machine 1 so that it wraps the cylinder 2 and plunger 3 assembly. Therefore, the machine 1 is very compact.

Even though that in the described embodiments reference is made to a traction mechanism with a lever 14 to compress the spring 4 or fluid to retract the plunger 3, they could be substituted by other equivalent systems that also permit to compress the spring 4 or the fluid for accumulating elastic potential energy in the plunger 3.

E.g. in FIG. 11 is shown a traction mechanism that includes a gearing-down system with an epicycloidal gear 25 (diagrammatically shown) engaged to the rod 5 of the plunger 3. This reduction system can be applied to any of the previously described embodiments.

The epicycloidal gear 25 presents the advantage that it offers a greater reduction ratio than the lever 14 system, so that the force required to move the rod 5 is lower. In the embodiment shown in FIG. 11, it is provided the epicycloidal gear 25 to be driven by an electric motor 26.

The invention claimed is:

1. Machine for preparing coffee comprising an infusion chamber to house at least a coffee dose, and means for feeding pressurized water to said infusion chamber (8), said means comprising a cylinder (2) and plunger (3) assembly, said plunger (3) defining inside the cylinder (2) a chamber (6) to house a preset quantity of water, and said plunger (3) being able to accumulate, in an active position, potential energy capable of being transmitted as a pressure to the water of said chamber (6), when said plunger (3) contacts, in said active position, with the water of said chamber (6), wherein said plunger (3) accumulates its potential energy from the compression force applied to one of a fluid and a spring, said compression force being applied when said plunger (3) is retracted in the chamber (6) of the cylinder (2), and wherein said infusion chamber (8) is placed adjacent below the water chamber (6) of said cylinder (2), both chambers including at least one hole (10) with a passage valve through which, once opened, passes the pressurized water to said infusion chamber (8), said plunger (3) moving back to the rest position inside said chamber (6) as pressurized water is fed through said hole (10).

2. Machine according to claim 1, wherein both chambers define a wall (9) including at least one hole (10).

3. Machine according to claim 2, wherein said wall (9) is provided with a recess (9a) configured to receive a dose of powder coffee, a mono-dose bag of ground coffee, or a coffee capsule.

4. Machine according to claim 1, wherein said infusion chamber (8) comprises a detachable wall (11) placed in correspondence with the wall (9) that comprises said hole (10).

5. Machine according to claim 1, wherein said plunger (3) accumulates, in its active position, potential energy from the compression force applied to a fluid placed in the cylinder (2) chamber that houses the rod (5) of said plunger (3).

6. Machine according to claim 5, which comprises a tank (23) for said fluid, said tank (23) being communicated with the chamber of the cylinder (2) that houses the rod (5) of said plunger (3).

7. Machine according to claim 1, wherein said plunger (3) accumulates, in its active position, elastic potential energy from the compression force applied to a spring (4) placed in the chamber of the cylinder (2) that houses the rod (5) of said plunger (3).

8. Machine according to claim 7, wherein said compression force is applied when the plunger (3) is retracted in the chamber (6) of the cylinder (2) provided to house said water, until it reaches said active position.

9. Machine according to claim 8, which comprises a traction mechanism (14, 15, 16) that acts on the rod (5) of said plunger (3) to retract said plunger (3) until said active position.

10. Machine according to claim 9, wherein said traction mechanism comprises a lever (14) coupled to clamps (16) capable of being engaged and disengaged to the rod (5) of said plunger (3), said clamps (16) permitting, in their engaging position, said rod (5) to be retracted when said lever (14) is driven in a preset rotation direction.

11. Machine according to claim 9, wherein said traction mechanism includes a gearing-down system with an epicycloidal gear (25) engaged to the rod (5) of said plunger (3).

12. Machine to claim 1, which comprises a duct that communicates the water chamber (6) of the cylinder (2) with a tank (19) for storing water, said duct permitting the water from said tank (19) to be sucked when said plunger (3) is retracted inside said chamber (6).

13. Machine according to claim 7, wherein said compression force is applied when a compressor element (7) of said spring (4) or fluid is moved, while said plunger (3) keeps its position fixed.

14. Machine according to claim 13, wherein said compressor element (7) is placed engaged to the end of the rod (5) opposed to said plunger (3), so that said spring (4) is compressed when said element (7) is moved at the end of said rod (5).

15. Machine for preparing coffee comprising an infusion chamber to house at least a coffee dose, and means for feeding pressurized water to said infusion chamber (8), said means comprising a cylinder (2) and plunger (3) assembly, said plunger (3) defining inside the cylinder (2) a chamber (6) to house a preset quantity of water, and said plunger (3) being able to accumulate, in an active position, potential energy capable of being transmitted as a pressure to the water of said chamber (6), when said plunger (3) contacts, in said active position, with the water of said chamber (6), characterized in that said infusion chamber (8) is placed adjacent below the water chamber (6) of said cylinder (2), both chambers including at least one hole (10) through which, once opened, passes the pressurized water to said infusion chamber (8), said plunger (3) moving back to the rest position inside said chamber (6) as pressurized water is fed through said hole (10), wherein said plunger (3) accumulates, in its active position, elastic potential energy from the compression force applied to a spring (4) placed in the chamber of the cylinder (2) that houses the rod (5) of said plunger (3), wherein said compression force is applied when the plunger (3) is retracted in the chamber (6) of the cylinder (2) provided to house said water, until it reaches said active position, wherein the machine further comprises a traction mechanism (14, 15, 16) that acts on the rod (5) of said plunger (3) to retract said plunger (3) until said active position, and wherein said traction mechanism comprises a lever (14) coupled to clamps (16) capable of being engaged and disengaged to the rod (5) of said plunger (3), said clamps (16) permitting, in their engaging position, said rod (5) to be retracted when said lever (14) is driven in a preset rotation direction.

16. Machine for preparing coffee comprising an infusion chamber to house at least a coffee dose, and means for feeding pressurized water to said infusion chamber (8), said means comprising a cylinder (2) and plunger (3) assembly, said plunger (3) defining inside the cylinder (2) a chamber (6) to house a preset quantity of water, and said plunger (3) being able to accumulate, in an active position, potential energy capable of being transmitted as a pressure to the water of said chamber (6), when said plunger (3) contacts, in said active position, with the water of said chamber (6), characterized in that said infusion chamber (8) is placed adjacent below the water chamber (6) of said cylinder (2), both chambers including at least one hole (10) through which, once opened, passes the pressurized water to said infusion chamber (8), said plunger (3) moving back to the rest position inside said chamber (6) as pressurized water is fed through said hole (10), wherein said plunger (3) accumulates, in its active position, elastic potential energy from the compression force applied to a spring (4) placed in the chamber of the cylinder (2) that houses the rod (5) of said plunger (3), wherein said compression force is applied when the plunger (3) is retracted in the chamber (6) of the cylinder (2) provided to house said water, until it reaches said active position, wherein the machine further comprises a traction mechanism (14, 15, 16) that acts on the rod (5) of said plunger (3) to retract said plunger (3) until said active position, and wherein said traction mechanism includes a gearing-down system with an epicycloidal gear (25) engaged to the rod (5) of said plunger (3).

* * * * *